United States Patent [19]

Kubo et al.

[11] Patent Number: 4,721,011

[45] Date of Patent: Jan. 26, 1988

[54] FOUR WHEEL DRIVE POWER TRANSMISSION SYSTEM WITH FRONT PROPELLER SHAFT INCLUDING NO UNIVERSAL JOINTS CONNECTING TRANSFER DEVICE TO FRONT DIFFERENTIAL

[75] Inventors: Seitoku Kubo; Yutaka Taga; Kunio Morisawa, all of Toyota, Japan

[73] Assignee: Toyota Jidosha Kabushiki Kaisha, Toyota, Japan

[21] Appl. No.: 903,241

[22] Filed: Sep. 3, 1986

[30] Foreign Application Priority Data

Sep. 4, 1985 [JP] Japan ................................ 60-195282

[51] Int. Cl.⁴ ........................ F16H 37/06; F16H 57/02
[52] U.S. Cl. .................... 74/665 T; 74/606 R; 74/710; 180/248
[58] Field of Search ............... 74/710, 740, 665 T, 74/606 R; 180/248, 249, 250

[56] References Cited

U.S. PATENT DOCUMENTS

| | | | |
|---|---|---|---|
| 1,812,801 | 6/1931 | Nus | 180/248 X |
| 3,703,107 | 11/1972 | Piret | 74/606 R X |
| 3,828,877 | 8/1974 | Fogelberg | 180/249 |
| 4,046,030 | 9/1977 | Suzuki | 74/710 |
| 4,223,566 | 9/1980 | Yamamori et al. | 74/606 R |
| 4,304,317 | 12/1981 | Vanzant et al. | 180/247 |
| 4,308,763 | 1/1982 | Brisabois | 74/606 R X |
| 4,364,285 | 12/1982 | Morisawa et al. | 74/606 R |
| 4,501,167 | 2/1985 | Saito | 74/606 R X |

FOREIGN PATENT DOCUMENTS

| | | | |
|---|---|---|---|
| 0177286 | 4/1986 | European Pat. Off. | |
| 731988 | 1/1943 | Fed. Rep. of Germany | 74/710 |
| 2300343 | 7/1973 | Fed. Rep. of Germany | 74/710.5 |
| 0193704 | 9/1986 | Fed. Rep. of Germany | |

OTHER PUBLICATIONS

Patent Abstracts of Japan, vol. 9, No. 92 (M-373) [1815], 20th Apr. 1985; & JP-A-59 216 766 (Nissan Jidosha K.K.), 06-12-1984.

*Primary Examiner*—Dirk Wright
*Attorney, Agent, or Firm*—Oblon, Fisher, Spivak, McClelland & Maier

[57] ABSTRACT

In an assembly for a vehicle of an engine and a four wheel drive power transmission system including a speed change device, a first power distribution device for rotationally dividing rotational power for the pair of either the front wheels or the rear wheels, wherein the engine, the speed change device and the first power distribution device are assembled in this order along a common central axis with one of two output shafts of the first power distribution device being shifted sideward of the central axis and directed toward the engine while the second power distribution device is mounted to a side of the engine with an input shaft thereof being directed toward and substantially aligned with the output shaft of the first power distribution device. A propeller shaft to connect the output shaft of the first power distribution device with the input shaft of the second power distribution device is firmly mounted at one end thereof to the output shaft of the first power distribution device to be supported and driven thereby and rotationally coupled at another end thereof with the input shaft of the second power distribution device by a splined sleeve engagement. Intermediate portion of the propeller shaft is rotatably supported by a radial bearing mounted to the speed change device.

4 Claims, 5 Drawing Figures

FOUR WHEEL DRIVE POWER TRANSMISSION SYSTEM WITH FRONT PROPELLER SHAFT INCLUDING NO UNIVERSAL JOINTS CONNECTING TRANSFER DEVICE TO FRONT DIFFERENTIAL

BACKGROUND OF THE INVENTION

The present invention relates to a four wheel drive power transmission system, and more particularly relates to such a four wheel drive power transmission system for a vehicle such as an automobile adapted for four wheel drive operation, in which the construction is improved so as to eliminate the provision of universal joints for a front propeller shaft incorporated therein, thereby to minimize noise and vibration and maximize transmission working life.

The present invention has been described in Japanese Patent Application Ser. No. 60-195282 (1985), filed by an applicant the same as the entity assigned or owed duty of assignment of the present patent application; and the present patent application hereby incorporates into itself by reference the text of said Japanese Patent Application and the claims and the drawings thereof; a copy is appended to the present application.

Further, the present inventors wish hereby to attract the attention of the examining authorities to their co-pending Patent Applications Ser. Nos. 903,243 and 903,239, which may be considered to be material to the examination of the present patent application, and which are coowned with or are subject to obligations of coassignment together with the present patent application.

In Japanese Utility Model Application Laying Open Publication Ser. No. 47-203 (1972), as well as in the publication Ser. No. 710,615 of the Society of Automotive Engineers (SAE), neither of which is it intended hereby to admit as prior art to the present patent application except to the extent in any case required by applicable law, there is disclosed a four wheel drive power transmission system, comprising, connected in order to a power unit such as for example a front mounted longitudinally disposed internal combustion engine, in the specified order, a speed change device (i.e., a gearbox or automatic transmission or the like) and a power distribution device for four wheel drive operation (a so called transfer device) having a front wheel drive output shaft and a rear wheel drive output shaft, with one end each of a front propeller shaft and a rear propeller shaft being connected respectively to said front wheel drive output shaft and to said rear wheel drive output shaft, and with the other ends of said front propeller shaft and said rear propeller shaft being respectively connected to respective input shafts of power distribution devices such as speed reducing differential devices for respectively the front wheels of the vehicle and the rear wheels of the vehicle; with, particularly, the power distribution device for the front wheels of the vehicle being attached and mounted to an oil pan of the internal combustion engine; and, further, with a front universal joint being provided between the input shaft of said power distribution device for the front wheels and the front end of the front propeller shaft drivingly connected thereto, and also a rear universal joint being provided between said front wheel drive output shaft of said power distribution device for four wheel drive and the rear end of said front propeller shaft which is connected thereto and is driven thereby.

In a thus constructed four wheel drive power transmission system, the front propeller shaft is disposed on and passes along one side of the series coupled combination of the internal combustion engine, the speed change device, and the power distribution device for four wheel drive operation, and along the same direction along which said three units are coupled in series; and, as mentioned above, conventionally the front end of said front propeller shaft is connected to the end of said input shaft of said power distribution device for the front wheels (hereinafter referred to as the front differential device) by means of a universal joint, and also the rear end of said front propeller shaft is connected to the front wheel drive output shaft of the power distribution device for four wheel drive by another universal joint. This is done because the central longitudinal axis of the aforesaid combination of the internal combustion engine, the speed change device, and the power distribution device for four wheel drive operation, which typically is the axial line of said front wheel drive output shaft of said power distribution device for four wheel drive and also of said input shaft of said front differential device, is not generally parallel with the line of said front propeller shaft, and hence said two such universal joints are inevitably conventionally required to be provided. However, the problem arises that the front such a universal joint tends to fall, in its longitudinal positioning, just by the joining portion between the internal combustion engine and the speed change device, which typically is the portion of the combination of the aforementioned three units coupled in series which projects most to the side, especially in the case that the speed change device is an automatic transmission in which case said automatic transmission typically includes a torque converter which is very fat and bulky and causes a bulge in the housing receiving it. In order to avoid interference between the front universal joint and the joining portion between the internal combustion engine and the speed change device, the installation position of said front universal joint must be considerably spaced apart from said joining portion, i.e. must be located at a substantial distance from the conjoined combination of the internal combustion engine and the speed change device, and this not only increases the space taken up by the four wheel drive power transmission system, but also creates the requirement that the central axial line of the front propeller shaft must be angled at a considerable angle from the longitudinal axis of the conjoined combination of the internal combustion engine and the speed change device, which means that the joint angles of the aforementioned front and rear universal joints are increased. This can lead to problems with noise and vibration during four wheel drive operation and during rotation of the front propeller shaft, as well as to shortened service life and unsatisfactory reliability. Further, disadvantages arise from the point of view of mass production, because of the requirement for the front propeller shaft, the universal joints, and the front differential device to be each manufactured and fitted in place with a high degree of accuracy, in order to avoid the danger of the occurrence of incorrect assembly.

SUMMARY OF THE INVENTION

The inventors of the present invention have considered the various problems detailed above in the aforementioned type of construction, from the point of view of the desirability of minimizing the joint angle of the universal joint joining the front propeller shaft and the power input member of the front differential device, as well as the joint angle of the universal joint joining the rear end of said front propeller shaft to the front wheel drive output shaft of the power distribution device for four wheel drive.

Accordingly, it is the primary object of the present invention to provide an improved four wheel drive power transmission system of the general type described above, which avoids the problems detailed above.

It is a further object of the present invention to provide such a four wheel drive power transmission system, which reduces the required joint angle for the universal joint joining the front propeller shaft and the power input member of the front differential device.

It is a further object of the present invention to provide such a four wheel drive power transmission system, which reduces the required joint angle for the universal joint joining the front propeller shaft and the front wheel drive output shaft of the power distribution device for four wheel drive.

It is a yet further object of the present invention to provide such a four wheel drive power transmission system, which minimizes noise and vibration.

It is yet further object of the present invention to provide such a four wheel drive power transmission system, which maximizes service life and reliability.

It is a yet further object of the present invention to provide such a four wheel drive power transmission system, which maximizes good mountability in the vehicle.

It is a yet further object of the present invention to provide such a four wheel drive power transmission system, which is easy to assemble and economical to manufacture.

According to the most general aspect of the present invention, these and other objects are attained by a four wheel drive power transmission system for a vehicle with an engine, comprising: (a) a speed change device, affixed against an end of said engine at a connection portion therebetween, and coupled to said engine so as to receive rotational power therefrom; (b) a power distribution device for four wheel drive, affixed against an end remote from said engine of said speed change device, coupled to said speed change device so as to receive rotational power from said speed change device, and provided with two rotational power output shafts between which it distributes said rotational power; (c) a first propeller shaft coupled to a one of said rotational power output shafts of said power distribution device for four wheel drive, and leading to conduct rotational power to a pair of wheels of said vehicle which are remoter from said engine; (d) a power distribution device for a pair of wheels of said vehicle closer to said engine, mounted to said engine, and comprising a power input shaft aligned so that its outer end generally points towards said power distribution device for four wheel drive and is substantially coaxial with the other of said rotational power output shafts thereof; and (d) a second propeller shaft a one end of which is rotationally coupled to said other of said rotational power output shafts of said power distribution device for four wheel drive and an other end of which is rotationally coupled to said power input shaft of said power distribution device.

According to such a four wheel drive power transmission system as specified above, although the axial position of installation of the construction which couples said second propeller shaft to said power input shaft of said power distribution device may be approximately corresponding to the joining portion between the body of the vehicle engine and the casing of the speed change device which is typically the fattest portion of the engine/transmission combination, i.e. the portion thereof which extends transversely to the greatest extent, nevertheless, because such a joining construction is not, according to the present invention as specified above, required to transmit power through any angle, and accordingly may be a very simple type of joining construction such as a spline joint which can be slim in transverse extent, thereby the installation position in the transverse direction of this joining construction can be brought sufficiently close to the central axis of said engine/transmission combination to ensure that the second propeller shaft can in fact as specified above extend substantially parallel to said central axis of the engine/transmission combination and to the central longitudinal axis of the vehicle, so as to allow said second propeller shaft and the joining constructions at both of its ends to be set to provide substantially direct drive in one axial line, i.e. not to have any joint angle. Thereby, there is no requirement for the second propeller shaft to be angled at all transversely to the central axial line of the body of the engine and to the casing of the speed change device. By this arrangement, therefore, no universal joints are required to be fitted at either end of this second propeller shaft. Thereby, the generation of noise and vibration, due to angling of this second propeller shaft, are prevented; and further, wear on such hypothetical universal joints is completely eliminated, since none are fitted; thus ensuring a long service life for the drive assembly including this second propeller shaft. A further important benefit is realized, of minimizing cost of the construction, since typically the cost of such universal joints makes up a substantial part of the cost of a conventional propeller shaft construction. Thus, the portion of the driving system for the aforesaid pair of wheels of said vehicle which are remoter from said engine, which is made up from and comprises the second propeller shaft and the joining constructions at both of the ends thereof, is located so as to be able to have a relatively slim portion thereof adjacent to and beside said connection portion between the body of the engine and the casing of the speed change device. Also, according to this construction, the power distribution device can be positioned close to the side wall of the engine or of its oil pan, and the rigidity of support provided for this portion of the transmission system including the power distribution device can be maximized.

Further, according to another particular specialization of the present invention, the above specified and other objects are more particularly attained by a four wheel drive power transmission system as specified above, wherein the rotational coupling between said second propeller shaft and said power input shaft of said power distribution device allows a certain amount of longitudinal motion between said second propeller shaft and said power input shaft of said power distribution device. This allows for dimensional errors in the axial direction of the drive construction elements such as the first propeller shaft and the power distribution device to be compensated for by this certain degree of axial play, and therefore such dimensional errors do not lead to problems in fitting and adjusting the transmission system appropriately.

Yet further, according to another particular specilization of the present invention, the above specified and other objects are more particularly attained by a four wheel drive power transmission system as specified above, further comprising a means for rotatably supporting from said speed change device an outer portion of said second propeller shaft. This will make the support of said second propeller shaft, and of the power transmission construction incorporating it as a whole, more sure and certain, thus enhancing transmission system life.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so in the various figures; and:

DESCRIPTION OF THE PREFERRED EMBODIMENT

Figure 1:
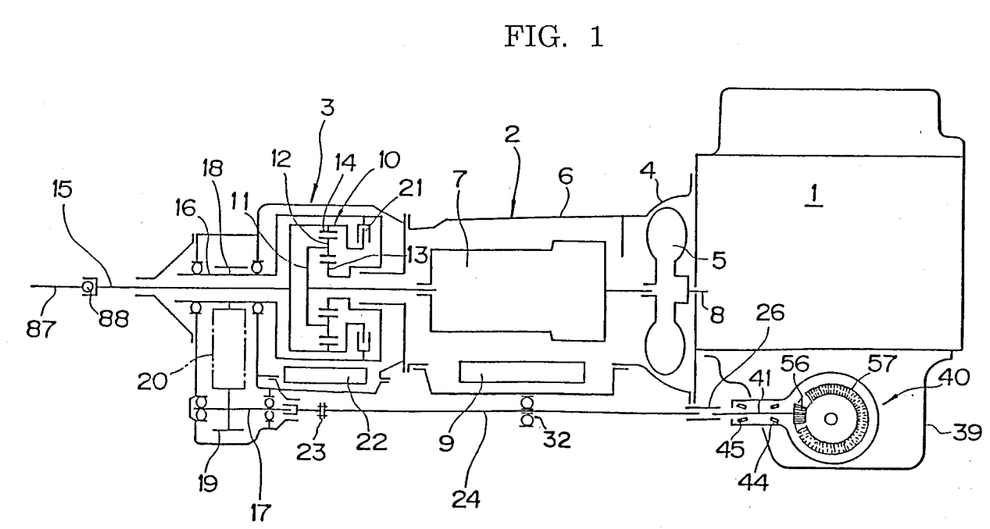
FIG. 1 is a longitudinal skeleton view of a vehicle power train which incorporates the preferred embodiment of the four wheel drive power transmission system of the present invention.

The present invention will now be described with reference to the preferred embodiment thereof, and with reference to the figures. FIG. 1 is a longitudinal skeleton view of a vehicle power train which incorporates the preferred embodiment of the four wheel drive power transmission system of the present invention. In this figure, the reference numeral 1 denotes an internal combustion engine of said vehicle, which is mounted, in this exemplary case, longitudinally in the front engine room (not particularly shown) of said vehicle. And the reference numeral 2 denotes an automatic speed change device (automatic transmission) of a per se known type, while 3 denotes a four wheel drive power transfer device.

In more detail, the automatic speed change device 2 incorporates a fluid torque converter 5 of a per se known construction, and the power input shaft (not particularly shown) of this fluid torque converter 5 is connected to and receives rotational power from a crank shaft (not shown either) of the internal combustion engine 1. And the fluid torque converter 5 is housed within a torque converter housing 4 fitted against and secured to the main body of the internal combustion engine 1, while the automatic speed change device 2 comprises a gear transmission mechanism 7, which is likewise housed within a speed change device housing 6 fitted against and secured to the torque converter housing 4 (although these may not be two separate members and are not shown as such in the figure, which is schematic). And the input shaft (not particularly shown) of the gear transmission mechanism 7 is connected to and receives rotational power from the power output shaft (not shown either) of the fluid torque converter 5; and thereby the gear transmission mechanism 7 receives rotational power from the internal combustion engine 1, with a certain degree of slippage and also torque converter 5 as is per se conventional. This gear transmission mechanism 7 may for the purposes of this specification be of a per se known automatically operated type incorporating various planetary gear mechanisms and friction engaging mechanisms such as clutches and brakes, and according to selective actuation of said friction engaging mechanisms provided by a hydraulic control mechanism 9 of a per se known sort provides any one of plurality of speed reduction stages between its said power input shaft and its said power output shaft.

The four wheel drive power transfer device 3 incorporates a central differential device 10 of a plantary gear wheel type for providing differential action between the front wheels of the vehicle and the rear wheels of the vehicle during the full time four wheel drive operation for which this four wheel drive power transmission system is adapted. Now the detailed construction of this central differential device 10 will be explained. It comprises a sun gear 13, a ring gear 14, a carrier 11, and a plurality of planetary pinions 12 rotatably mounted to said carrier 11 and meshed between the sun gear 13 and the ring gear 14 and performing coupling planetary movement between them in a per se known manner. The carrier 11 functions as an input member for this central differential device 10, and is rotationally connected to the power output shaft of the gear transmission mechanism 7 via a shaft which passes through the central axis of the hollow sun gear 13. The ring gear 14 functions as one power output member for the central differential device 10 for supplying power to the rear wheels of the vehicle, and is rotationally connected to a first or rear wheel power output shaft 15 which extends out of the four wheel drive power transfer device 3 in the direction to the left as seen in FIG. 1, i.e. towards the rear of the vehicle in this particular exemplary implementation. And the sun gear 13 functions as another power output member for the central differential device 10 for supplying power to the front wheels of the vehicle, and is rotationally connected to a sleeve shaped intermediate front wheel drive shaft 16 via a drum member fitted around the planetary gear mechanism as a whole. This intermediate front wheel drive shaft 16 is hollow and is fitted around the portion of the rear wheel power output shaft 15 which lies within the housing of this four wheel drive power transfer device 3, and on its outside cylindrical surface there is fixedly mounted a sprocket wheel 18. An endless chain 20 is fitted around this sprocket wheel 18 and around another sprocket wheel 19 provided below (and to one side of) said sprocket wheel 18 (from the point of view of the figure and in the actual vehicle body also), with the central axis of said sprocket wheel 19 being extended parallel to the central axis of said sprocket wheel 18. The sprocket wheel 19 is fixedly mounted on a second or front wheel power output shaft 17, one end of which protrudes from the housing of this four wheel drive power transfer device 3 in the leftwards direction in the figure, i.e. towards the front end of the vehicle in this particular exemplary implementation and parallel to the central longitudinal axis of the combination of the internal combustion engine 1, the automatic speed change device 2, and the four wheel drive power transfer device 3.

Further, within the four wheel drive power transfer device 3 there is provided a hydraulically operated wet type clutch 21, which selectively either rotationally connects together the sun gear 13 and the ring gear 14, or alternatively allows said members to rotate freely with respect to one another. This wet clutch 21 is selectively operated by a hydraulic control device 22. Accordingly, the four wheel drive power transfer device 3, which receives rotational power input from the gear transmission mechanism 7 and outputs said rotational power to the rear wheel power output shaft 15 and to the front wheel power output shaft 17, can be caused either to provide differential action for distributing said rotational power between said rear wheel power output shaft 15 and said front wheel power output shaft 17, i.e. between the front wheels of the vehicle and the rear wheels thereof, or not to provide any such differential action and just to drive said shafts 15 and 17 independently.

Via a universal joint 88 of a per se known sort, the rear end of the rear wheel power output shaft 15 rotationally drives the front end of a first or rear wheel propeller shaft 87.

And, via a flange coupling or flange joint 23 also of a per se known sort, the front end of the rear wheel power output shaft 15 rotationally drives the second or rear end of a front wheel propeller shaft 24. Thus, the front wheel propeller shaft 24 extends alongside and generally below the automatic speed change device 2 including the fluid torque converter 5 therein, generally parallel to the longitudinal axis thereof. The front end of this front wheel propeller shaft 24 is rotationally connected, via a spline joint construction 25 likewise of a per se known sort, to the rear end of a sleeve shaft 26; reference should now be made to FIGS. 3 and 4 which show this portion of the construction in a more detailed plan view. In more detail, this spline joint construction 25 comprises a set of male splines formed on the rear end of the front wheel propeller shaft 24 and a set of female splines formed on the inner surface of a hollow end portion formed on the sleeve shaft 26, said male and female splines being mutually engaged and mated together.

Figure 4:
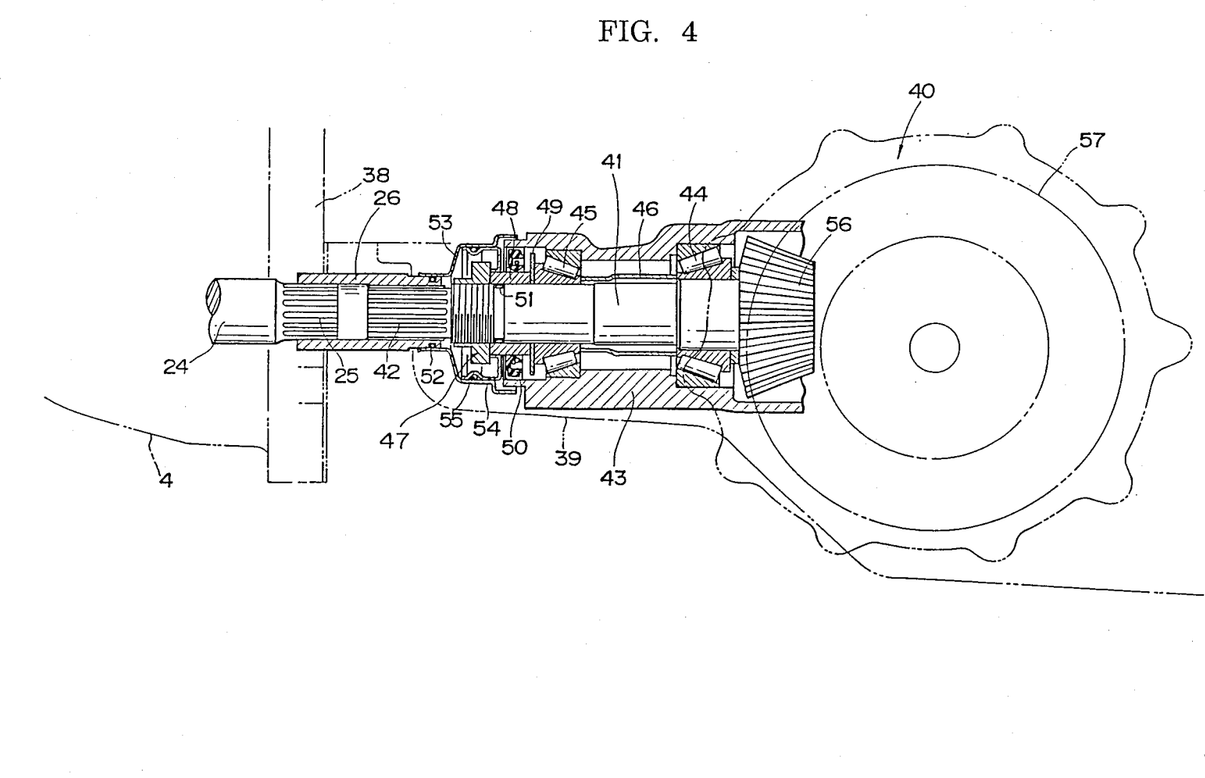
FIG. 4 is an enlarged partly sectional partly schematic side view showing the end of said propeller shaft, said sleeve shaft, and a portion of said front differential device.

According to the shown construction as will be the preferred layout, the axial position of installation of the spline joint construction 25, which couples the front end of the front wheel propeller shaft 24 to the power input member (the sleeve shaft 26) of the second power distribution device or front differential device 40, is located as approximately beside the joining portion between the body of the internal combustion engine 1 and the casing of the automatic speed change device 2; this joining portion is denoted in FIG. 4 by the reference numeral 38, and is only diagrammatically shown. Said joining portion 38 is typically the fattest portion of the engine/transmission combination, i.e. is typically the portion thereof which extends transversely to the greatest extent. Although, according to this arrangement, the spline joint construction 25 lies beside this fattest portion of the engine/transmission combination, nevertheless, because said spline joint construction 25 is by its constructional nature rather thin, therefore the installation position in the transverse direction of this spline joint construction 25 can be brought sufficiently close to the central axis of said engine/transmission combination to ensure that the front wheel propeller shaft 24 can extend substantially parallel to said central axis and to the central longitudinal axis of the vehicle, which allows the angle through which said spline joint construction 25 is required to be angled (and similarly the angle through which the flange coupling 23 is required to be angled, also) to be set to be substantially 0°; so that no universal joints or the like are required at these portions, and instead said flange coupling 23 and said spline joint construction 25 will suffice for their purposes, although they are only satisfactory for direct straight line transmission of rotational power and are not substantially able to transmit rotational power around any corners or through any angles. Thus, the portion of the front drive system, which is made up from and comprises the front propeller shaft 24, the flange joint 23 and the spline joint construction 25, and the sleeve shaft 26, has a substantially slim portion thereof, to wit the spline joint construction 25 and the sleeve shaft 26, adjacent to and beside said connection portion 38 between the body of the internal combustion engine 1 and the casing of the automatic speed change device 2.

Figure 3:
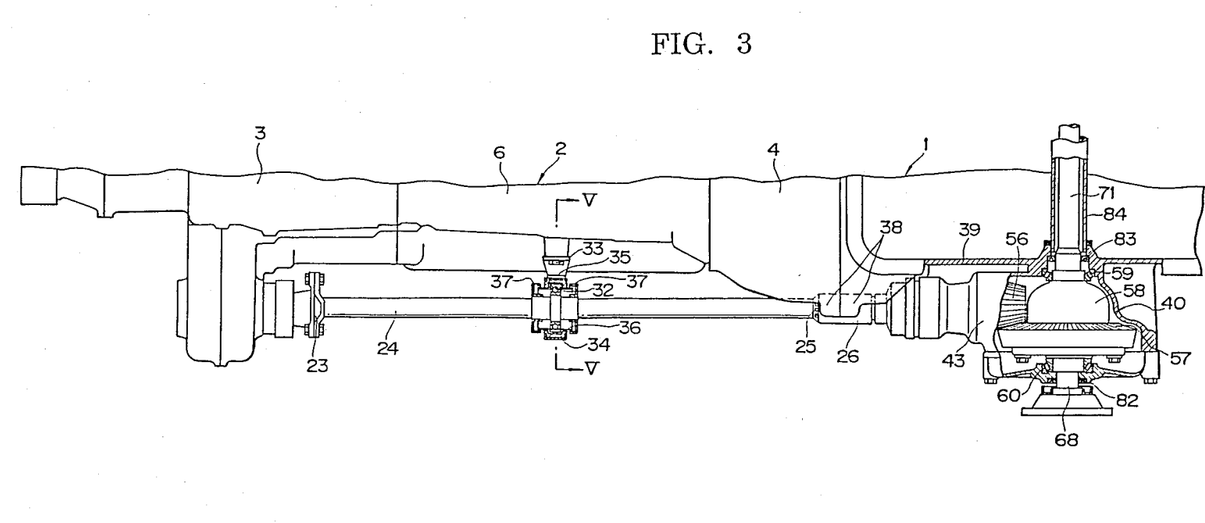
FIG. 3 is a partly sectional plan view of a front propeller shaft, a sleeve shaft coupled thereto, and a front differential device coupled to the sleeve shaft, included in said vehicle power train.
Figure 5:
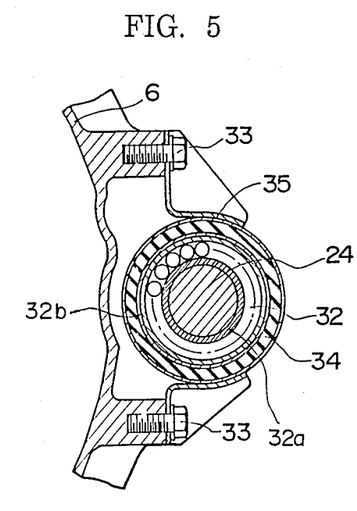
FIG. 5 is a sectional view of a ball bearing and its mounting arrangements, taken in a plane shown by the arrows V—V in FIG. 3.

Around an intermediate portion of the front propeller shaft 24 there is fitted the inner race 32a of a radial ball bearing 32. The outer race 32b of this radial ball bearing, as best shown in the sectional view of FIG. 5, is fitted into the inner cylindrical surface of a toroidal anti vibration cushion member 34, which may be made of synthetic rubber or some similar elastomer. The outer cylindrical surface of said anti vibration cushion member 34 is fitted into a bearing support bracket 35, which is secured by a plurality of bolts 33 to the side of the speed change device housing 6 for the automatic speed change device 2. Thereby, the sleeve shaft 26 is rotatably supported from said speed change device housing 6. As best seen in FIG. 3, around the periphery of the radial ball bearing 32 there is fitted a cylindrical dust cover 36, attached to the bearing bracket 35, and further there are provided two toroidal dust covers 37 fixed to the front propeller shaft 24. These members in cooperation form an enclosing and shielding construction which prevents foreign bodies or contaminants such as road dirt or muddy water or the like from entering into the operational portions of the radial ball bearing 32.

The end of the sleeve shaft 26 remote from the spline joint construction 25 is engaged by means of another spline construction 42 with the outer end of a drive pinion shaft 41, which constitutes the power input shaft of the front differential device 40. This drive pinion shaft 41 is rotatably supported from a differential casing 43 of the front differential device 40, which is formed integrally with the oil pan 39 of the internal combustion engine 1, by means of two tapered roller bearings 44 and 45; and the drive pinion shaft 41 and the sleeve shaft 26, while they are rotationally coupled together by means of the splined construction 42, are able to move axially with respect to one another by the sliding action of said splined construction 42. The tapered roller bearings 44 and 45 are maintained at their appropriate spacing with regard to one another by the action of a distance collar 46 fitted over the drive pinion shaft 44 between them, and the thrust force from a nut 47 threaded on to the drive pinion shaft 41 is applied through a small diameter thrust collar 48 and a seat 49 fitted over the drive pinion shaft 41 so as to be able to be slid axially therealong, whereby a particular and desirable thrust preload is applied to said tapered roller bearings 44 and 45.

The thrust collar 48 is proximate to an open end of the tubular extending portion of the differential casing 43 which houses the drive pinion shaft 41, and an oil seal 50 is provided between said thrust collar 48 and said open end of said tubular extending portion of the differential casing 43. Also, an O-ring 51 is provided between the thrust collar 48 and the drive pinion shaft 41. Further, at the end of the sleeve shaft 26 remote from the spline joint construction 25 and proximate to the drive pinion shaft 41 there is fitted a stepped cylindrical dust cover 53, which is adapted to be slidable in the axial direction, and has interposed between it and the periphery of the end portion of the sleeve shaft 26 an O-ring 52. This dust cover 53 extends so as to surround the position of the nut 47 and so as to fit over the periphery of the aforesaid open end of the tubular extending portion of the differential casing 43. And, further, around the periphery of the thrust collar 48 there is fitted a cylindrical dust cover 54, and this dust cover 54 fits, with the interposition of an O-ring 55 in between them, into the inner cylindrical surface of the dust cover 53, so as to be slidable with respect thereto in their axial direction. Thus, the dust covers 53 and 54 mutually cooperate so as to seal the region of the splined portion 42, and at the same time form an enclosing and shielding construction which prevents foreign bodies or contaminants such as road dirt or muddy water or the like from entering into the region in which the oil seal 50 is installed.

At the other end of the drive pinion shaft 41, which is supported from the housing of the differential device by the tapered roller bearing 44, i.e. at its inner end, there is provided a bevel gear drive pinion 56, and this bevel gear drive pinion 56 is on the side of the internal combustion engine 1 from a ring gear 57 of the front differential device 40, and is constantly meshed with said ring gear 57. The ring gear 57 is fitted to a differential housing 58 and together with this differential housing 58 is rotatably supported from the oil pan 39 of the internal combustion engine 1 and from a differential casing cover 61 fitted to the differential casing 43 by means of tapered roller bearings 59 and 60.

Figure 2:
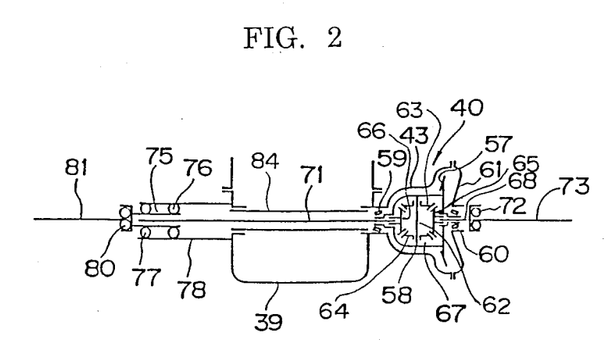
FIG. 2 is a skeleton diagram showing the front wheel drive portion of said vehicle power train, and particularly showing the arrangements for the rotational power for one of the front wheels of the vehicle to be passed through the engine oil pan.

Referring particularly to the skeleton view of FIG. 2 which shows the lower part of the internal combustion engine 1 with its oil pan 39 affixed thereto and with the front differential device 40, within the housing 58 of said front differential device 40 there is fitted a differential gear wheel mechanism 67, which comprises a differential pinion shaft 62 fitted in said differential housing 58, two differential pinions 63 and 64 rotatably fitted on said differential pinion shaft 62, and left and right side gear wheels 65 and 66 respectively, rotatably supported within the differential housing 58 and each of them meshing with both of said two differential pinions 63 and 64. The left side gear wheel 65 (from the point of view of the vehicle although it is on the right side in the figure) is coupled by means of a spline construction to a left side power output shaft 68, while the right side gear wheel 66 is coupled by means of a spline construction to a left side intermediate power output shaft 71. The left side power output shaft 68 projects rightward in the figure out from the housing 58 of the differential device to the outside, and at its end portion (see FIG. 2) it is coupled via a universal joint 72 to a left side drive shaft 73, which transfers rotational power to the left side front wheel of the vehicle, possibly via another universal joint; said left side front wheel and so on are not shown in the figures. On the other hand, the right side intermediate power output shaft 71 passes right through the oil pan 39 as will be explained shortly, and projects out therefrom on the other side of said oil pan 39 from the front differential device 40, to be there coupled by means of a spline construction to a right side power output sleeve shaft 75. This right side power output sleeve shaft 75 is rotatably supported by means of two radial ball bearings 76 and 77 in a bearing housing 78 which is formed as a projection from the oil pan 39 and in a bearing housing cover attached to this bearing housing 78. Said right side power output sleeve shaft 75 is then drivingly coupled at its outer end portion (see FIG. 2) via a universal joint 80 to a right side drive shaft 81, which transfers rotational power to the right side front wheel of the vehicle, possibly via another universal joint; said right side front wheel and so on are also not shown in the figures. The left side drive shaft 73 and the right side drive shaft 81 are of substantially the same length.

An oil seal is fitted between the left side power output shaft 68 and the differential casing cover 61, and similarly an oil seal is fitted between the right side intermediate power output shaft 71 and the differential casing 43. Thus, the differential casing 43 is sealed from the outside by the action of these oil seals. In the oil pan 39 there is provided a cover tube 84 spanning between its right and left sides, and the right side intermediate power output shaft 71 passes through this cover tube 84 and is thereby isolated from the interior of the oil pan 39.

A cylindrical dust cover is fitted around the outer end of the left side drive shaft 73, so as to form an enclosing and shielding construction which prevent foreign bodies or contaminants such as road dirt or muddy water or the like from entering into the region in which the oil seal on this side is installed. Likewise, another cylindrical dust cover is fitted around the outer end of the right side drive shaft 75, so as to form another enclosing and shielding construction which prevents foreign bodies or contaminants such as road dirt or muddy water or the like from entering into the region in which the radial ball bearing 77 is installed.

Thus, by means of the provision of the above explained construction in the above described configuration, although the axial position of installation of the spline joint construction 25 which couples the front end of the front wheel propeller shaft 24 to the power input member of the front differential device 40 may be approximately corresponding to the joining portion 38 between the body of the internal combustion engine 1 and the casing of said automatic speed change device 2 which is typically the fattest portion of the engine/transmission combination, i.e. the portion thereof which extends transversely to the greatest extend, nevertheless, because the spline joint construction 25 is inherently by its nature slim in transverse extent, thereby the installation position in the transverse direction of this spline joint construction 25 can be brought sufficiently close to the central axis of said engine/transmission combination to ensure that the front wheel propeller shaft 24 can extend substantially parallel to said central axis and to the central longitudinal axis of the vehicle, so as to allow said spline joint construction 25 (and the flange coupling 23 also) to be set to provide substantially direct drive in one axial line, i.e. not to have any joint angle. Thereby, there is no requirement for the front wheel propeller shaft 24 to be angled at all transversely to the central axial line of the body of the internal combustion engine 1 and the casing of said automatic speed change device 2. By this arrangement, therefore, no universal joints are required to be fitted at either end of this front propeller shaft 24. Thereby, the generation of noise and vibration, due to the angling of this front wheel propeller shaft 24, are prevented; and, further, wear on such hypothetical universal joints is completely eliminated, since none are fitted; thus ensuring a long service life for the front drive assembly including the flange joint 23 and the spline joint construction 25 and the front wheel propeller shaft 24. A subsidiary benefit is realized, of minimizing cost of the construction, since typically the cost of such universal joints makes up a substantial part of the cost of a propeller shaft construction. Thus, the portion of the front drive system, which is made up from and comprises the front propeller shaft 24, the flange joint 23 and the spline joint construction 25, and the sleeve shaft 26, is located so as to have a very slim portion thereof, to wit the spline joint construction 25, adjacent to and beside said connection portion 38 between the body of the internal combustion engine 1 and the casing of the automatic speed change device 2. And, similarly, the support construction for said front drive system including the bearing 35, which inevitably is a fattened portion of said front drive system, is arranged to be axially located, not beside said connection portion 38 which would undesirably displace the front drive system to the side again, but beside a more rearward and narrower portion of the speed change device housing 6, so as not to cause any problem with regard to angling of the front wheel propeller shaft 24. Also, by the shown construction, the front differential device 40 can be positioned close to the side wall of the internal combustion engine 1 or of its oil pan 39, and the rigidity of support provided for this front drive system including the front differential device 40 can be maximized.

The central differential device 10 is a drive torque non balanced distribution type, and as specified above the ring gear 14 thereof is connected so as to supply rotational power to the rear wheel drive system, while the sun gear 13 thereof is connected so as to supply rotational power to the front wheel drive system. And, when the clutch 21 is released by its control system 22, the amount of drive torque supplied to the rear vehicle wheels is less than the amount of drive torque supplied to the front vehicle wheels. On the other hand, when the clutch 21 is engaged by its said control system 22, the proportion of drive torque supplied to the front vehicle wheels is at most 50% of the total drive torque, so that not so much torque is in this case supplied to the front vehicle wheels, and as a result the front differential device 40 may be made of a fairly small scale construction, bearing in mind the distributed amount of the drive torque and thereby the freedom of choice for determining the installation position for the drive pinion shaft 41 is increased, and it becomes possible to easily position said drive pinion shaft 41 substantially coaxially with the front wheel power output shaft 17 of the four wheel drive power transfer device 3, as described above.

Although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. For example, although in the shown preferred embodiment there was disclosed an application of the present invention to a four wheel drive vehicle configuration in which the engine was mounted in a front engine room, alternatively the present invention could be applied to a vehicle with the engine mounted in the rear thereof, i.e. to a rear engined vehicle in which the engine was mounted in a rear engine room. In this case, the roles of the front and of the rear propeller shafts should be reversed. Other variations could be envisaged. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. A four wheel drive power transmission system for a vehicle with an engine, a pair of front wheels and a pair of rear wheels, comprising:

a speed change device affixed to an axial end of said engine and operationally coupled to said engine so as to receive rotational power therefrom;

a first power distribution device affixed to an axial end remote from said engine of said speed change device and operationally coupled to said speed change device so as to receive rotational power therefrom, said first power distribution device having first and second mutually sidewardly shifted and oppositely directed rotational power output shafts for distributionally supplying two rotational power outputs respectively either for said pair of front wheels or said pair of rear wheels or vice versa, said second output shaft being positioned sidewardly of a principal body of said first power distribution device and directed toward said engine;

a first propeller shaft coupled to said first rotational power output shaft of said first power distribution device for supplying rotational power to either said pair of front wheels or said pair of rear wheels which are remote from said engine;

a second power distribution device mounted to said engine and having a rotational power input shaft substantially aligned with said second rotational power output shaft of said first power distribution device for receiving a rotational power input therefrom and two rotational power output shafts for distributionally supplying two rotational power outputs for the pair of either said rear wheels or said front wheels which are closer to said engine;

a second propeller shaft firmly mounted at one end thereof to said second rotational power output shaft of said first power distribution device so as to be firmly supported thereby and to be rotationally driven thereby, another end of said second propeller shaft being rotationally coupled with said rotational power input shaft of said second power distribution device by a spline engagement; and a radial bearing mounted to said speed change device for rotatably supporting an axially intermediate portion of said second propeller shaft.

2. A four wheel drive power transmission system according to claim 1, wherein said spline engagement is an axial insertion of an externally splined end of said second propeller shaft into an internally splined sleeve end portion supported by said rotation power input shaft of said second power distribution device.

3. A four wheel drive power transmission system according to claim 1, wherein said second propeller shaft runs generally along and beside the combination of said engine, said speed change device, and said first power distribution device.

4. A four wheel drive power transmission system according to claim 1, wherein said second propeller shaft is substantially parallel to a central longitudinal axis of the combination of said engine, said speed change device, and said first power distribution device.

* * * * *